(12) United States Patent
Lohr

(10) Patent No.: US 6,872,041 B2
(45) Date of Patent: Mar. 29, 2005

(54) OVERSIZED WRENCHING HEAD TENSION CONTROL BOLT

(76) Inventor: Kenneth Lohr, P.O. Box 1387, Humble, TX (US) 77347

(*) Notice: Subject to any disclaimer, the term of this patent is extended or adjusted under 35 U.S.C. 154(b) by 0 days.

(21) Appl. No.: 10/408,173

(22) Filed: Apr. 4, 2003

(65) Prior Publication Data
US 2003/0215302 A1 Nov. 20, 2003

Related U.S. Application Data
(60) Provisional application No. 60/374,676, filed on Apr. 22, 2002.

(51) Int. Cl.[7] .............................................. F16B 33/00
(52) U.S. Cl. ........................... 411/378; 411/402; 411/5
(58) Field of Search ................................. 411/378, 424, 411/411, 361, 402–410, 5

(56) References Cited

U.S. PATENT DOCUMENTS

| | | | |
|---|---|---|---|
| 1,241,048 A | * | 9/1917 | Steffenberg ................ 408/181 |
| 2,928,302 A | | 3/1960 | Owen |
| 3,752,030 A | * | 8/1973 | Steurer ....................... 411/411 |
| 4,177,352 A | | 12/1979 | Dunbar |
| 4,290,337 A | * | 9/1981 | Kuwata et al. ................ 411/2 |
| 4,917,555 A | | 4/1990 | Taubert |
| 5,125,778 A | * | 6/1992 | Sadri .......................... 411/361 |
| 5,609,454 A | * | 3/1997 | Lee ............................ 411/384 |
| 6,102,642 A | * | 8/2000 | Kawashita et al. ......... 411/401 |
| 6,264,414 B1 | | 7/2001 | Hartmann et al. |
| 6,343,904 B1 | | 2/2002 | Wang |
| 6,416,102 B1 | * | 7/2002 | Howard .................... 296/35.1 |
| 6,626,627 B2 | * | 9/2003 | Oesterle et al. ............. 411/410 |

* cited by examiner

Primary Examiner—Flemming Saether
(74) Attorney, Agent, or Firm—Keeling Hudson L.L.C.; Kenneth A. Keeling

(57) ABSTRACT

A tension control bolt includes a shank, the shank including a threaded section and a breakaway section, and a bolt head, the bolt head constructed with a wrenching section and a flange section intermediate the wrenching section and the shank, the flange section having a generally circular bearing section, the diameter of the bearing section exceeding the distance between opposed flat wrenching surfaces of the wrenching section.

8 Claims, 4 Drawing Sheets

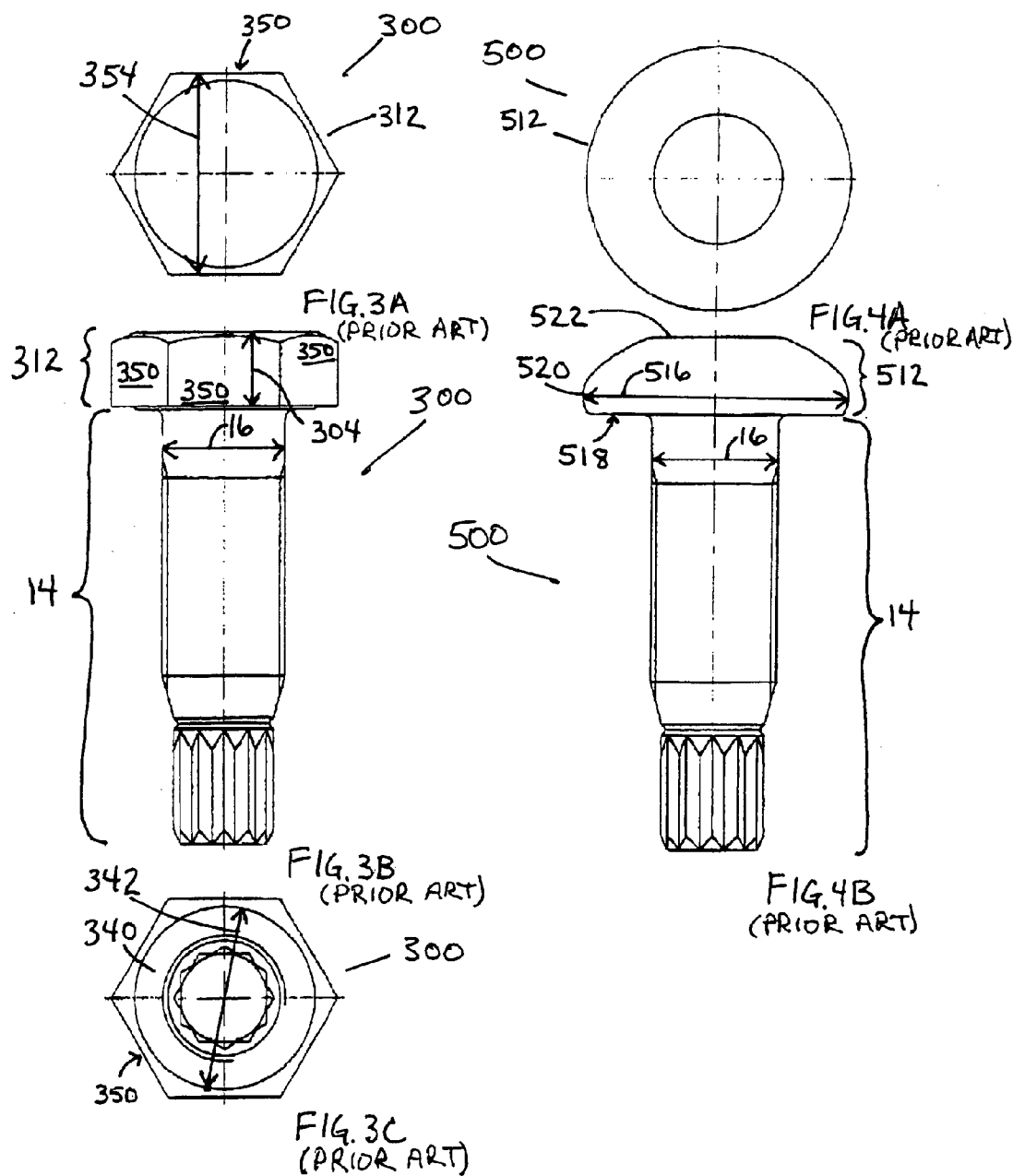

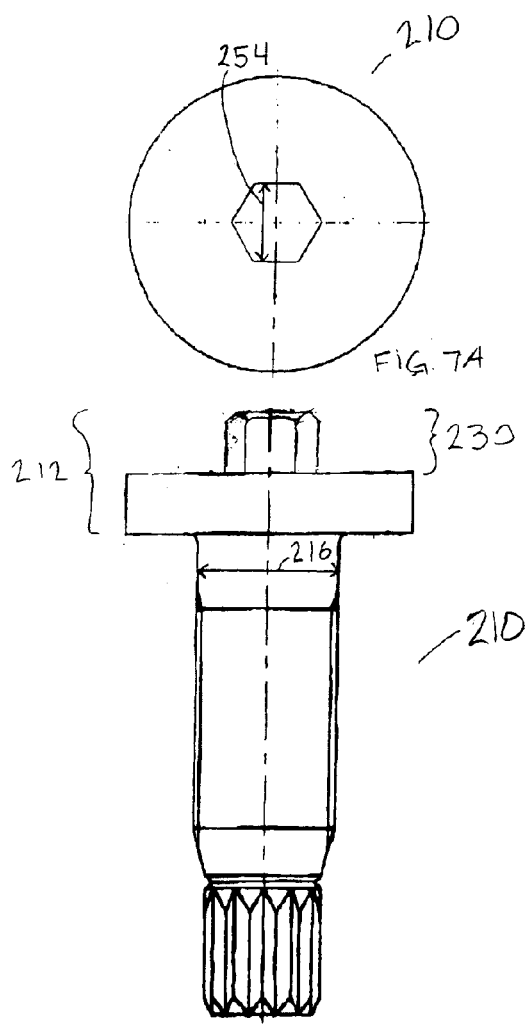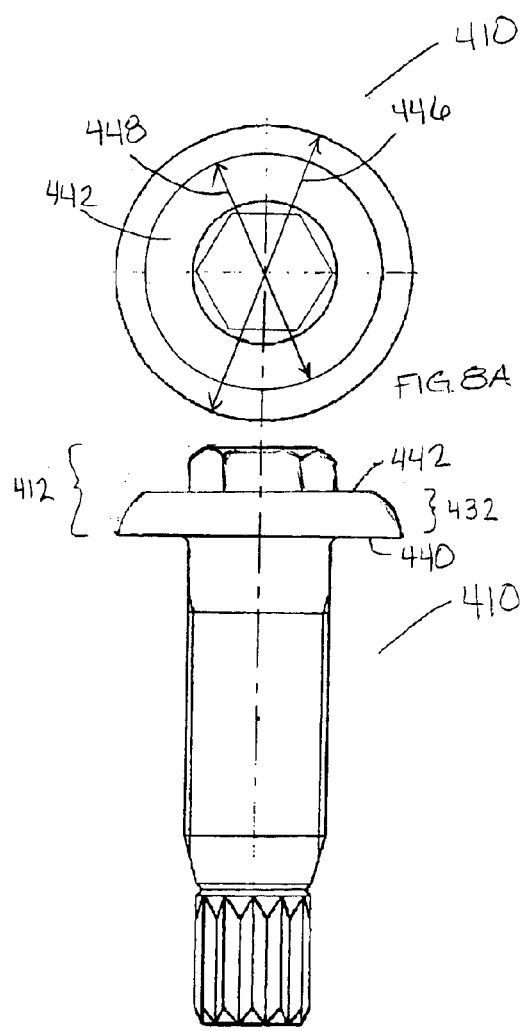

OVERSIZED WRENCHING HEAD TENSION CONTROL BOLT

CROSS-REFERENCE TO RELATED APPLICATIONS

Provisional Application No. 60/374,676 filed Apr. 22, 2002.

STATEMENT REGARDING FEDERALLY SPONSORED RESEARCH OR DEVELOPMENT

Not Applicable.

BACKGROUND OF THE INVENTION

1. Field of the Invention

The invention is generally related to fasteners for structural steel framing and more specifically to a bolt configuration for high-strength tension control fasteners.

2. Description of the Related Art

Structural steel framing is used to provide vertical and horizontal stability in numerous civil construction applications requiring high-strength fasteners of large steel members, including by way of example, large buildings, industrial frameworks, bridges and towers.

Tension control fasteners have become commonly used in the field of structural steel framing, particularly for the connection of structural steel framing members. A significant advantage of tension control fasteners is that they can be applied with an appropriately designed installation tool to a predetermined torque relatively quickly.

A prior art tension control fastener set includes a bolt and a nut with washers as required by the particular application. An exemplary tension control bolt incorporates a breakaway section at the end of the threaded portion of the bolt, with a groove intermediate the threaded portion and the breakaway section. The breakaway section is designed to break off, at the reduced-diameter groove, when a tension above a design level is induced in the bolt during the installation. An installation tool holds the bolt, grips the breakaway section with a conforming wrench chuck and tightens the nut until the breakaway section twists off at the groove.

Prior art tension control fasteners include bolts having conventional hexagonal heads providing surfaces for interface with wrenches and bolts having rivet or rounded heads without wrenching surfaces. The first type of bolt is referred to herein as hexagonal head bolts and the second type is referred to herein as rivet head bolts.

Because of structural and safety concerns a number of organizations have developed structural steel framing industry standards and specifications for the manufacture, application and installation of fasteners for connecting structural steel framing members. Such organizations include the American National Standards Institute ("ANSI"), the ASTM International ("ASTM"), the Research Counsel on Structural Connections ("RCSC") and the American Institute of Steel Construction ("AISC").

The usual material specification for conventional high strength hexagonal head bolts in steel-to-steel structural connections is ASTM A325. ASTM A490 is specified when higher strength is required. ASTM specification F1852 is a standard developed specifically for tension control bolts previously manufactured to A325 specifications. ASTM F1852 allows for the use of hexagonal head bolts, rivet head bolts and alternate design heads. Alternate design heads may be allowed under such specifications provided that they have a bearing surface and head height equal to or larger than required for heavy hex structural bolts in ANSI B18.2.1.

The connection of two members or plies, each possessing a hole, is inherent in the use of fasteners for structural steel members. Such holes may be of different shapes and sizes. Descriptions of such holes include: (1) a standard hole, (2) an oversized hole, (3) a short-slot hole or (4) a long-slot hole. Holes may be classified by size in relationship to the appropriate bolt as follows:

a standard hole=db plus 1/16 inch (~1.6 mm);

an oversized hole=db plus up to 5/16 inch (~8.0 mm);

a short-slotted hole=(db plus up to 1/16 inch [~1.6 mm]) by (db plus up to 3/8 inch [~9.6 mm]); and a long-slotted hole=(db plus up to 1/16 inch [~1.6 mm]) by (2.5 times the db).

As used herein, "db" means bolt diameter.

The stress nature of the connection establishes minimum requirements for size of the bolt shank. Holes in the members to be connected must be large enough to accommodate the minimum required bolt diameter.

The size and type of hole contacting the head determines the requirement for a washer under the head of the bolt. Generally, hexagonal head bolts and rivet head bolts may be used without washers intermediate the bolt head and the member when the bolt head is adjacent a ply having a standard hole, but require washers when used with other types of holes. Bolts may be used without washers intermediate the bolt head and the ply in a standard hole. Generally, washers are required in oversized holes, short-slotted holes and long-slotted holes. However, alternate design head bolts may be approved for use without washers. Rivet head bolts are used in standard, oversize and short-slot holes without washers intermediate the bolt head and the ply if the rivet head bolt has a diameter equivalent to the diameter of the structural steel framing industry standard washer that would otherwise be applied.

Examples of the prior art follow:

U.S. Pat. No. 2,928,302 issued to Owen et al. on Mar. 15, 1960, discloses a means for achieving a predetermined extent of loading when tightening up nuts on bolts and studs, and provides a bolt or stud adapted to achieve this result when employing an appropriate tool for tightening up the nut, the bolt or stud having a tool anchoring part which shears off when a predetermined extent of reaction torque has been applied thereto in tightening up the nut.

U.S. Pat. No. 4,177,352 issued to Dunbar et al. on Dec. 4, 1979 discloses a shear bolt assembly wherein an independent shear component is fastened into the end of the bolt shank in order to provide torsional relief from lateral stress.

U.S. Pat. No. 4,290,337 issued to Kuwata et al. on Sep. 22, 1981 discloses a fastener set comprising a bolt body, and a nut and washer which are fitted onto the bolt body, wherein the bolt body has a notched portion which can be broken off by a predetermined torsional force. A lubricant is disclosed to make the torsional force relatively uniform in a variety of atmospheric conditions.

U.S. Pat. No. 4,917,555 issued to Taubert on Apr. 17, 1990 discloses a joining element possessing parallel, concentric rings with a diameter greater than the fastening threads, to provide improved elasticity in the joining element when tensionally employed. Such patent does not address tension control bolts for structural steel framing.

U.S. Pat. No. 6,264,414 B1 issued to Hartmann et al. on Jul. 24, 2001 discloses a fastener possessing an elongation portion, a threaded portion and a fitting portion along the shank, with the threaded portion and the fitting portion having larger cross-sectional areas than the elongation portion to provide greater elasticity to the fastener when stressed. Such patent does not address tension control bolts for structural steel framing.

U.S. Pat. No. 6,343,904 B1 issued to Wang on Feb. 5, 2002 discloses a rivet-head tension bolt with anti-skid projections extending radially from the bearing surfaces of both the head and accompanying washer.

The thickness of the work pieces to be connected, a distance called the grip, determines the length of bolt needed to accommodate the size of the nut and washer. In applications requiring the use of a washer, the bolt length must be increased by the thickness of the washer to accommodate for the requirement of the washer. In many instances such additional length requires a longer, more expensive bolt. Additionally, industry specifications typically require that the hexagonal head of a hexagonal head bolt be equivalent in size to the nut required for the same bolt. This, in effect, mandates the cost of providing two fully effective wrenching surfaces when only one such surface is normally required for installation of the fastener set. Additionally, the required combined height of the hexagonal head and a washer is a disadvantage in instances where there is little working space. As the construction industry has recognized the foregoing and other disadvantages of conventional hexagonal head bolts, the use of oversize rivet head bolts has become increasingly common.

The bearing surface of rivet head bolts may eliminate the requirement to use a washer on the head end of a fastener set in many instances. However, prior art rivet head bolts suffer the disadvantage that they do not allow wrenching of the bolt head. Removal of rivet head bolts after installation may require torching or cutting the old bolt out of the hole because there is no wrenching surface on the rivet head. After a passage of time, removal of installed bolts is even more difficult due to paint, insulation, oxidation and other factors that increase resistance to torque. Also, every grade, diameter, length and lot number of bolts used for structural steel must be tested prior to installation. Removal of a rivet head bolt after such testing is required. Such removal may require cutting the bolt, as torches cannot be used adjacent test equipment.

Nicked or damaged threads may cause a rivet head bolt to roll during installation. Lack of a wrenching head renders completion of installation or removal of the partially-attached bolt difficult as there is no gripping surface on the rivet head.

Additionally, it is advantageous to provide a wrenching surface to install bolts when conventional tension control tooling cannot be used due to clearance.

It is also advantageous to provide a wrenching surface to re-tighten, referred to as touching up, when installation of nearby bolts results in the bolt loosening up.

An alternative method of applying required torque allows prescribed nut tightening with the bolt head prevented from rotating. A wrenching surface allows the nut to be held in place while torque is applied to the nut.

It would be an improvement to the prior art to provide a bolt head having the advantages of rivet head bolts while providing wrenching surfaces to allow an alternative means to install bolts when clearances do not allow the use of conventional tension control tooling.

BRIEF SUMMARY OF THE INVENTION

The present invention provides a bolt having an expanded bearing surface for use with standard, oversize or slotted holes and further provides a bolt head wrenching surface.

Accordingly, the objects of my invention is to provide, among other things, a structural steel framing fastener that:

provides a head with sufficient bearing surface and thickness to eliminate the requirement of a head washer in many instances;

provides a wrenching surface on the head to allow for bolt removal or further securing means;

provides a wrenching surface on the head suitable for applying substantial amounts of torque required in structural steel framing and assembly; and meets structural steel framing industry standards for fasteners used in structural steel framing and assembly.

Other objects of my invention will become evident throughout the reading of this application.

BRIEF DESCRIPTION OF THE DRAWINGS

FIG. 3A is a top view of a prior art structural steel framing hexagonal head tension control bolt.

FIG. 3B is a side view of a prior art structural steel framing hexagonal head tension control bolt.

FIG. 3C is a bottom view of a prior art structural steel framing hexagonal head tension control bolt.

FIG. 4A is a top view of a prior art structural steel framing oversized rivet head tension control bolt.

FIG. 4B is a side view of a prior art structural steel framing oversized rivet head tension control bolt.

FIG. 7A is a top view of an alternate embodiment of a structural steel framing oversized wrenching head tension control bolt of the present invention.

FIG. 7B is a side view of an alternate embodiment of a structural steel framing oversized wrenching head tension control bolt of the present invention.

FIG. 8A is a top view of an alternate embodiment of a structural steel framing oversized wrenching head tension control bolt of the present invention.

FIG. 8B is a side view of an alternate embodiment of a structural steel framing oversized wrenching head tension control bolt of the present invention.

DESCRIPTION OF THE INVENTION

Prior Art Examples

Figure 1A:
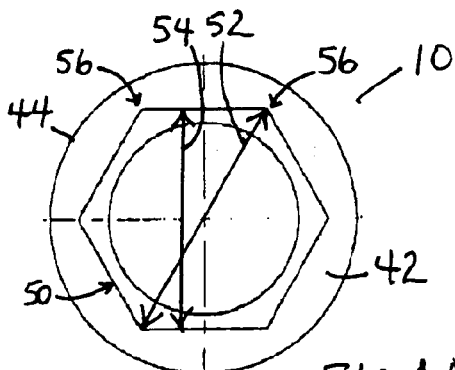
FIG. 1A is a top view of a structural steel framing oversized wrenching head tension control bolt of the present invention.

FIGS. 3A–C and 4A–B depict prior art hexagonal head tension bolt 300 and prior art oversized rivet head tension bolt 500. Hexagonal head bolt 300 and rivet head bolt 500 are designed for connection of structural steel framing members. Bolts 300 and 500 are generally constructed in accordance with industry specifications, particularly ASTM A490 or F1852. Referring to FIGS. 5A–B and 6A–B, prior art securing nut 70 and prior art washer 80 are depicted.

Referring to FIGS. 3A and 3B prior art hexagonal head tension bolt 300 includes hexagonal head 312 attached to an end of shank 14 and axially aligned with shank 14. Hexagonal head 312 includes six side surfaces 350 said surfaces defining a hexagon when viewed from the top. Flat width 354 is defined as the distance between one head side surface 350 to the opposite side surface 350. Shank 14 has a diameter 16 near head 312. Hexagonal head 312 includes a bearing surface 340. In the prior art hexagonal head tension bolt 300, the diameter 342 of bearing surface 340 is less than or equal to the flat width 354.

The bolt head 312 of bolt 300 has a limited bearing surface 340, allowing the head to rotate if not held. It is noted that bolt 300, FIGS. 3A–C, is not currently commercially practiced in the structural steel framing industry and has not been produced commercially for a number of years. The rivet head bolt and oversized rivet bolt 500, FIGS. 4A–B, are currently produced and used commercially for tension bolt applications in the structural steel framing industry.

Figure 5A:
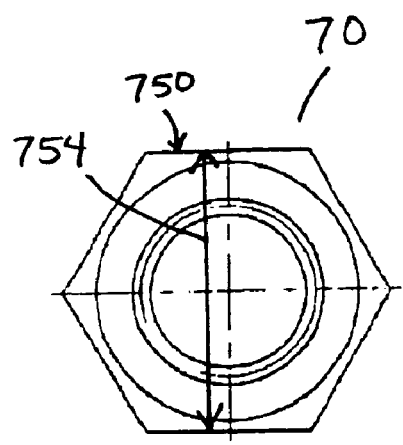
FIG. 5A is a top view of a prior art structural steel framing securing nut.
Figure 6A:
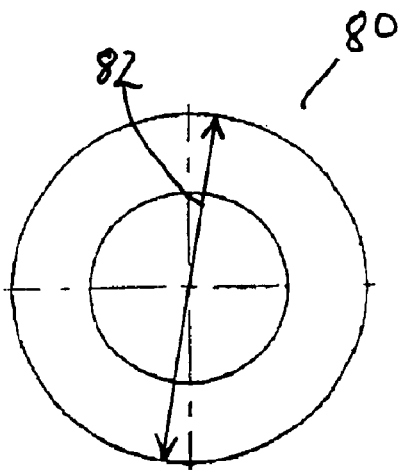
FIG. 6A is a top view of a prior art structural steel framing washer.
Figure 5B:
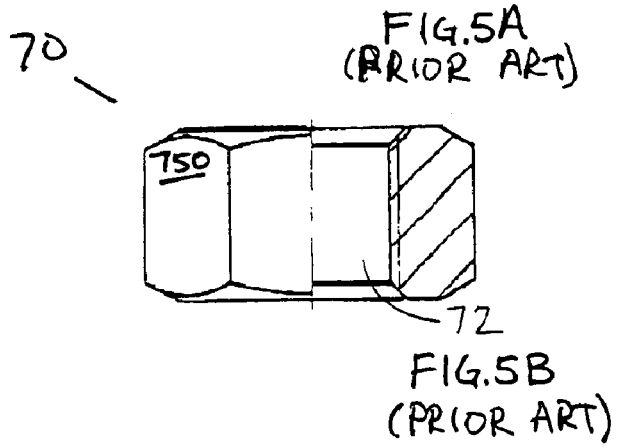
FIG. 5B is a side view of a prior art structural steel framing securing nut.
Figure 6B:
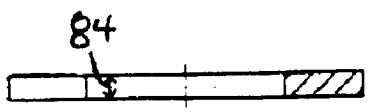
FIG. 6B is a side view of a prior art structural steel framing washer.

Referring to FIGS. 5A and 5B, nut 70 includes six nut side surfaces 750. Nut width 754 is the distance between one surface 750 and the opposite surface 750.

A structural steel framing industry standard for nut 70 is that nominal nut width 754 is in the range of 1.58 to 1.75 times the nominal shank diameter 16, such ratio varying within such range based on the size of bolt 300.

A structural steel framing industry standard for tension bolts 300 is that flat width 354 is in the range of 1.58 to 1.75 times the shank diameter 16, such ratio varying within such range based on the size of bolt 300. A structural steel framing industry standard for tension head bolts 300 up to 1½" (~38.1 mm) shank diameter 16 is that the height 304 of head 312 is in the range of 0.61 to 0.625 times the shank diameter 16.

A structural steel framing industry standard for washer 80 is that nominal outside diameter 82 of washer 80 is 1.875 to 2.625 times the nominal diameter 16 of shank 14 for bolts having shank diameter 16 of up to 2" (~50.8 mm), such ratio varying within such range based on the size of bolt 300. For bolts 300 having shank 14 larger than 2" (~50.8 mm) diameter, the nominal outside diameter 82 of washer 80 is at least 1.78 times the nominal diameter 16 of shank 14. A structural steel framing industry standard for the height 84 of washer 80 for bolts up to 1½" (~38.1 mm) diameter 16 is that the height 84 is in the range of 0.091 to 0.194 times diameter 16. For applications requiring use of a washer 80 together with head 312 for structural bolts up to 1½" (~38.1 mm) diameter 16, the range of the total height 84 (washer 80) plus height 304 (head 312) is 0.70 to 0.82 times the diameter 16.

Referring to FIG. 4A and FIG. 4B, prior art oversize rivet head tension bolt 500 is depicted. Prior art oversize rivet head 512 is attached to an end of shank 14 and is axially aligned with shank 14. Oversize rivet head 512 has a circular perimeter 520. A bearing surface 518 comprises the underside of the oversize rivet head 512. Bearing surface 518 is circular with an outer diameter 516. Oversize rivet head 512 has a flattened top 522. A structural steel framing industry practice is to construct oversize rivet head 512 with a bearing surface 518 outer diameter 516 in the range of 1.875 to 2.625 times the nominal diameter 16 of shank 14 for bolts having shank diameter of up to 2" (~50.8 mm), such ratio varying within such range based on the size of bolt 500.

The Present Invention

Figure 1B:
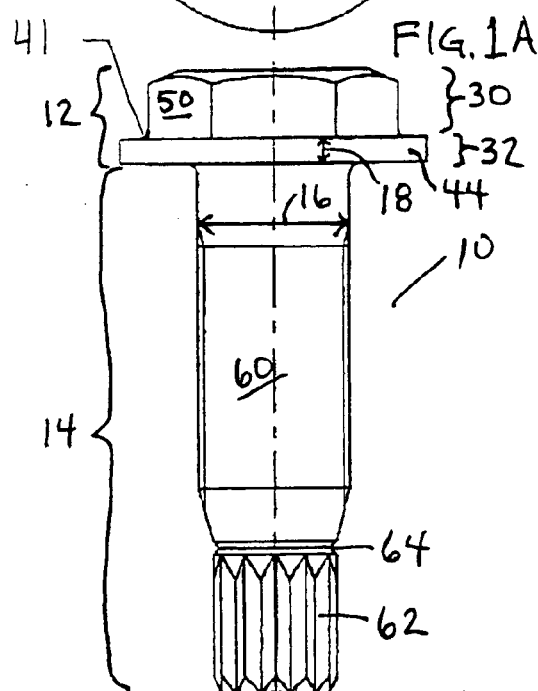
FIG. 1B is a side view of a structural steel framing oversized wrenching head tension control bolt of the present invention.
Figure 1C:
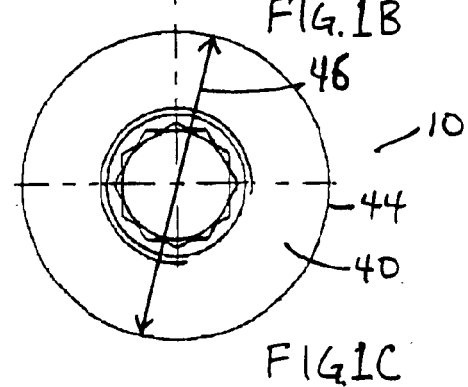
FIG. 1C is a bottom view of a structural steel framing oversized wrenching head tension control bolt of the present invention.

Referring to FIGS. 1A, 1B and 1C, the oversized wrenching head bolt 10 of the present invention is depicted. Oversized wrenching head bolt 10 has an oversized head 12 and shank 14. Shank 14 has a cylindrical shape. Shank 14 includes breakaway section 62, thread section 60 and groove 64. Head 12 is at one end of shank 14. Breakaway section 62 is at the other end of shank 14. Groove 64 is intermediate breakaway section 62 and thread section 60. Threaded section 60 extends along a length of shank 14. Threaded section 60 co-operatively engages internal threading 72 of a conventional nut 70. In some applications, thread section 60 may extend along substantially all of the length of shank 14 between head 12 and groove 64.

Breakaway section 62 is a section of shank 14. Groove 64 extends circumferentially around shank 14 intermediate threaded section 60 and breakaway section 62. In an exemplary embodiment, breakaway section 62 is longitudinally splined, serrated or ribbed. In operation, breakaway section 62 may be gripped by a specially designed wrench chuck (not shown) of an installation tool (not shown) that provides a means for turning the nut 70 relative to the bolt 10. When the torque applied to breakaway section 62 relative to the nut 70 exceeds a predetermined level, breakaway section 62 breaks away from shank 14. Groove 64 is constructed such that groove 64 defines the narrowest part of shank 14. Accordingly, breakaway section 62 breaks away from shank 14 at groove 64. Commercially-practiced tensions bolts 10 may have a different connection mechanism than splining, serration or ribbing for the wrench chuck with breakaway section 62. In such instances, reference herein to breakaway section 62 encompass structures compatible with such wrench chucks as the scope of the present invention is independent of the means of connection of breakaway section 62 with the wrenching chuck.

Head 12 is integrally constructed with shank 14. Head 12 includes wrenching section 30 and flange section 32. Wrenching section 30 includes six side surfaces 50. Side surfaces 50 define a hexagon when viewed from the top. The flat width 54 of the wrenching section 30 is the distance between a surface 50 and the directly opposite wrenching surface 50. Surfaces 50 result in wrenching section 30 having major width 52, the span from one apex 56 to the directly opposite apex 56 (each such apex 56 defined by the intersection of two surfaces 50) greater than flat width 54.

Flange section 32 is a flat cylinder segment intermediate wrenching section 30 and shank 14. Flange section 32 has a height 18. Flange section 32 includes outer edge 44 distal shank 14.

Wrench section 30 and flange section 32 are each axially aligned with shank 14.

Standing bolt 10 on breakaway section 62 for reference purposes with head 12 up and breakaway section 62 down, bearing surface 40 of flange section 32 is parallel with top surface 42 of flange section 32. Each wrenching surface 50 is perpendicular to top surface 42, with fillet 41 at such interfaces minimized to allow for maximum operational contact of a wrench (not shown) with wrenching surfaces 50.

Bearing surface 40 has a diameter 46. In the preferred embodiment of the present invention bearing surface 40 diameter 46 is greater than flat width 54 of the wrenching section 30.

In the preferred embodiment of bolt 10, bearing surface diameter 46 is in the range in the range of 1.875 to 2.625 times the nominal diameter 16 of shank 14 for shank diameters 16 up to 2" (~50.8 mm), such ratio varying within such range based on the size of bolt 500. For bolts 10 having shank diameter 16 above 2" (~50.8 mm), the diameter 46 is at least twice shank diameter 16 less ½" (~12.7 mm) in the preferred embodiment. Accordingly, the minimum bearing surface diameter 46 is at least 1.75 time shank diameter 16.

In the preferred embodiment of bolt 10, the height 18 of flange 32 is in the range of at least 0.091 to 0.194 times shank diameter 16 for bolts having diameter 16 up to 1½" (~38.1 mm). For bolts 10 having shank diameter 16 greater than 2" (~50.8 mm), the flange height 18 is at least ¼" (~6.35 mm).

In the preferred embodiment of the present invention, the total height of bolt head 12 is in the range of 0.61 to 0.625 times the shank diameter 16. The height of wrenching section 30 is the difference between the total height of bolt head 12 and the height 18 of flange section 32.

The preferred embodiment of the present invention provides a bolt 10 having a flange that provides washer bearing surface and thickness in compliance with industry standards in the structural steel framing industry and total height, including flange section 32 height and wrenching section 30 height, equivalent to the total of an industry standard bolt head.

In the present invention, flat width 54 may be an arbitrarily defined dimension independent of shank diameter 16. The wrenching section 30 is not the primary attachment means of bolt 10 as the installation tool is normally utilized to install the tension bolt 10 without engaging wrenching section 30, so it is not necessary that the flat width 54 conform to a structural steel framing industry standard. Specifically, the flat width 54 of the preferred embodiment is less than the industry standard minimum flat width 354 of at least 1.78 times the nominal diameter of bolt 300.

In a preferred embodiment of the present invention, the flat width 54 is accordingly constructed smaller than the flat width 754 of the nut 70 to be installed with the particular size of bolt 10. As the wrenching section 30 is not the primary attachment means, flat width 54 may be the same dimension for bolts 10 in a range of sizes.

Bolt 10 is installed in accordance with the method of installation of tension bolts as previously described herein. Bolt 10 can be used without a washer for use adjacent a hole (not shown) into which bolt 10 will be inserted and against which flange section 32 will contact, such hole being a standard hole (not shown), an oversized hole (not shown) or a short-slotted hole (not shown). A conventional wrench (not shown) may be utilized on wrenching section 30 to steady or locate bolt 10 at a particular location during installation.

In the event that tensioning of the bolt 10 with nut 70 is required in an area where clearance does not allow use of a tension bolt installation tool, conventional wrenches (not shown) may be applied to bolt 10 wrenching section 30 and nut 70. In the event that removal of bolt 10 is required, conventional wrenches (not shown) may be applied to wrenching section 30 and nut 70.

Figure 2:
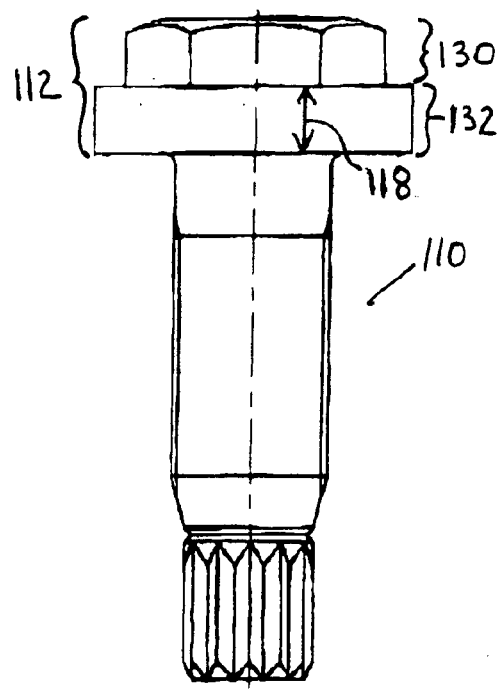
FIG. 2 is a side view of an alternate structural steel framing oversized wrenching head tension control bolt of the present invention.

Referring to FIG. 2, an alternate embodiment of heavy head bolt 110 is depicted. In such instances flange 132 can be constructed to a predetermined size when a minimum washer thickness is required. Heavy head bolt 110 is similar to oversized head bolt 10, except for the dimensions of heavy head 112. Flange section 132 is constructed to a predetermined height 118 of at least the minimum structural steel framing industry standard height of washer 80. Wrenching section 130 is constructed to a height of at least the minimum structural steel framing industry standard height for hexagon head 312. Such heavy head bolt 110 accordingly meets the cumulative industry thickness standards for a bolt head and a washer. However, heavy head bolt 110 requires more material to construct than the optimal structure of the preferred embodiment.

Referring to FIGS. 7A and 7B, another alternate embodiment of the bolt head 212 is shown. Small hexagonal head bolt 210 is similar to head bolt 10 except the flat width 254 is less than the shank diameter 216. As previously explained, because the bolt is not normally installed using the wrenching section 230, the flat width 254 is not required to conform to a structural steel framing industry standard.

Referring to FIGS. 8A and 8B, another alternate embodiment of the bolt head 412 is shown. In this embodiment, flange section 432 has a taper such that the bearing surface 440 has a diameter 446 greater than the diameter 448 of the top surface 442.

The foregoing description of the present invention contemplates industry-standard hexagonal wrenching sections 30. The teachings of the present invention apply to wrenching sections of alternative configurations providing wrenching surfaces, including other polygon structures and structures including inverted wrench attachment means.

The foregoing disclosure and description of the invention is illustrative and exemplary thereof. Various changes in the details of the illustrated construction may be made within the scope of the appended claims without departing from the spirit of the invention. The present invention should only be limited by the following claims and their legal equivalents.

I claim:

1. A tension control bolt for joining structural steel members comprising:

a head and a shank;

said shank comprising a threaded section and a breakaway section;

said threaded section intermediate said head and said breakaway section;

said shank having a reduced diameter area intermediate said threaded section and said breakaway section;

said breakaway section having an installation tool engagement surface;

said head comprising a wrenching section and a flange section;

said flange section including a bearing surface;

said bearing surface having a bearing surface diameter;

said wrenching section having a plurality of wrenching surfaces, said wrenching surfaces perpendicular to said flange bearing surface;

said wrenching section having a flat width comprising the distance between opposed wrenching surfaces;

said bearing surface diameter greater than said flat width;

said shank threaded section having a shank diameter;

said bearing surface diameter in the range of 1.75 to 2.625 times said shank diameter;

said flange having a flange height;

said flange height at least 0.091 times said shank diameter;

said bolt having a bolt head height;

said bolt head height including said flange height;

said bolt head height in the range of 0.61 to 0.70 times said shank diameter; and said bolt operable for installation with a said structural steel member without installation of a washer intermediate said bearing surface and said member.

2. The device in claim 1, further comprising:
said bolt head height in the range of 0.61 to 0.625 times said shank diameter.

3. The device in claim 1, further comprising:
said flat width less than 1.78 times said shank diameter.

4. The device in claim 1, further comprising:
said flat width less than said shank diameter.

5. A tension control bolt and nut for joining structural steel members having oversized or slotted holes, comprising:
said bolt comprising a head and a shank;
said shank having a threaded section and a splined section;
said nut having a threaded shaft for co-operatively engaging said shank threaded section;
said shank threaded section intermediate said head and said splined section;
said shank having a reduced diameter area intermediate said threaded section and said splined section;
said oversized head comprising a wrenching section and a flange section;
said flange section including a bearing surface;
said bearing surface having a bearing surface diameter;
said wrenching section having a plurality of wrenching surfaces, said wrenching surfaces perpendicular to said flange bearing surface;
said wrenching section having a flat width comprising the distance between opposed wrenching surfaces; and
said bearing surface diameter greater than said flat width;
said flange having a flange height;
said flange height in a range of 0.091 to 0.194 times said shank diameter;
said shank threaded section having a shank diameter;
said bearing surface diameter in the range of 1.75 to 2.625 times said shank diameter;
said bolt having a bolt head height;
said bolt head height including said flange height;
said bolt head height in the range of 0.61 to 0.70 times said shank diameter; and
said bolt operable for installation with a said structural steel member without installation of a washer intermediate said bearing surface and said member.

6. The device in claim 5, further comprising:
said bolt head height in the range 0.61 to 0.625 times said shank diameter.

7. The device in claim 5, further comprising:
said nut having a nut width comprising the distance between opposed nut wrenching surfaces; and
said head flat width less than said nut width.

8. The device in claim 5, further comprising:
said shank having a shank diameter; and
said head flat width less than said shank diameter.

* * * * *